United States Patent [19]

Naumann

[11] 3,895,912
[45] July 22, 1975

[54] CARBON MONOXIDE MONITOR
[75] Inventor: Robert J. Naumann, Huntsville, Ala.
[73] Assignee: The United States of America as represented by the Administrator of the National Aeronautics and Space Administration, Washington, D.C.
[22] Filed: Nov. 6, 1974
[21] Appl. No.: 521,603

[52] U.S. Cl. ............... 23/255 E; 23/254 E; 73/23; 331/37; 331/65
[51] Int. Cl....G01n 27/00; G01n 31/10; G01n 31/12
[58] Field of Search ........... 23/254 E, 255 E, 232 E; 331/37, 65; 73/23

[56] References Cited
UNITED STATES PATENTS

| 2,916,358 | 12/1959 | Valentine et al. ................ 23/254 E |
| 3,164,004 | 1/1965 | King, Jr. ................................ 73/23 |
| 3,329,004 | 7/1967 | King, Jr. ................................ 73/23 |
| 3,385,100 | 5/1968 | Michael ............................. 73/23.1 |
| 3,577,222 | 5/1971 | Ward ............................. 23/232 E X |

Primary Examiner—Robert M. Reese
Attorney, Agent, or Firm—Wayland H. Riggins; L. D. Wofford, Jr.; John R. Manning

[57] ABSTRACT

A device for automatic, real time monitoring of carbon monoxide and for providing a continuous read out of the concentration of carbon monoxide. The monitoring device includes two Y-cut, temperature sensitive quartz crystals which are encapsulated in a helium filled can. One of the cans containing a quartz crystal is surrounded by a wire mesh which carries a thin layer of hopcalite coating. The hopcalite is used for oxidizing the carbon monoxide and the resulting heat of the reaction is detected by the temperature sensitive crystal. Each crystal is driven by a conventional crystal controlled oscillator circuit with a constant frequency bias of a few hundred Hz. The frequencies of the two oscillator circuits are fed into a conventional mixer circuit which beats the frequencies together and produces a single net frequency which is the difference between the two frequencies. The net frequency signal is converted to a D.C. analog voltage signal which is then fed into a suitable display device for providing a continuous readout of the concentration of carbon monoxide.

3 Claims, 1 Drawing Figure 3,895,912

CARBON MONOXIDE MONITOR

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention is directed to a device for providing an automatic, real time monitoring of carbon monoxide and for providing a continuous read out of the concentration carbon monoxide.

Heretofore, techniques for monitoring carbon monoxide have included chemical analysis, gas chromatography, infra-red techniques, and other analytical methods. None of these lend themselves to automatic continuous monitoring and the highly sensitive or very accurate quantitative measurements involved in these methods require very expensive equipment.

Devices have been developed, as for instance in U.S. Pat. No. 3,329,004, for analyzing certain specific fluid materials which are based on detecting the heats of reactions of the various materials. Such a device includes coated piezoelectric crystals which are temperature sensitive and will change their frequency in direct proportion to changes in temperature. However, this device is not directed to the detection and continuous monitoring of carbon monoxide. For continuous monitoring in this device the catalytic coating must be periodically removed from the surface of the crystal for replenishing of the catalytic material. In some cases the catalytic material cannot be easily removed from the crystal. The monitoring device in accordance with the present invention encapsulates the crystal material in a can which is then pressurized with helium so that no contaminating deposits will be formed on the crystal surface. In addition, the catalytic coating of the present invention is carried as a thin layer by a wire mesh material that surrounds the can so that the catalytic coating can be removed very easily and conveniently and replaced without affecting the reliability and accuracy of the crystal in detecting the heat of reaction.

SUMMARY OF THE INVENTION

It has been found in accordance with the present invention that an effective, inexpensive automatic real time monitor for carbon monoxide can be provided that can provide a continuous read out of carbon monoxide. The monitoring device comprises a first temperature sensitive crystal material encapsulated in a first container which is pressurized with a heat conducting gas, such as helium. A second temperature sensitive crystal material encapsulated in a second container pressurized with helium, is provided for use as a reference crystal. The first crystal and container is surrounded by a thin layer of hopcalite coating which is carried by a wire mesh for reacting with the carbon monoxide. The first crystal is used for detecting heat from the reaction, and is connected in an oscillator circuit having a variable output frequency which is controlled by the temperature and hence, frequency of the first crystal so that as the crystal is heated the frequency of the oscillator circuit will change. The second crystal is connected in an oscillator circuit in such a manner so as to control the frequency of said circuit. In the absence of carbon monoxide, the first and second temperature sensitive crystals, and hence the oscillator circuits controlled thereby, have matched output frequencies. A mixer circuit is connected to the oscillator circuits for receiving the output frequencies therefrom and for combining the frequencies in a manner so as to provide a single net output signal representative of the difference between the two frequencies. The mixer circuit, in essence, substracts the smaller frequency from the larger frequency to provide the single net frequency. The single net frequency is then fed into a conventional frequency-to-analog voltage converter circuit which converts the net frequency signal into an analog voltage. The analog voltage is then displayed by suitable display means to provide a continuous read out of the voltage.

Accordingly, it is an important object of the present invention to provide an automatic, real time monitor for carbon monoxide that will provide a continuous read out of the concentrations of carbon monoxide in a fluid stream.

Another important object of the present invention is to provide a carbon monoxide monitor for continual quantitative analysis that can detect minute concentrations of carbon monoxide in a reliable and accurate manner.

Still another important object of the present invention is to provide a carbon monoxide monitor which uses a catalytic coating surface which can be easily resupplied in continual use.

Still another important object of the present invention is to provide an effective carbon monoxide monitor using heat detecting crystals wherein the surface of the crystals is protected from contaminating deposits by encapsulating the crystals in containers which are then pressurized with a heat conducting gas such as helium.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF THE PREFERRED EMBODIMENT

Figure 1:
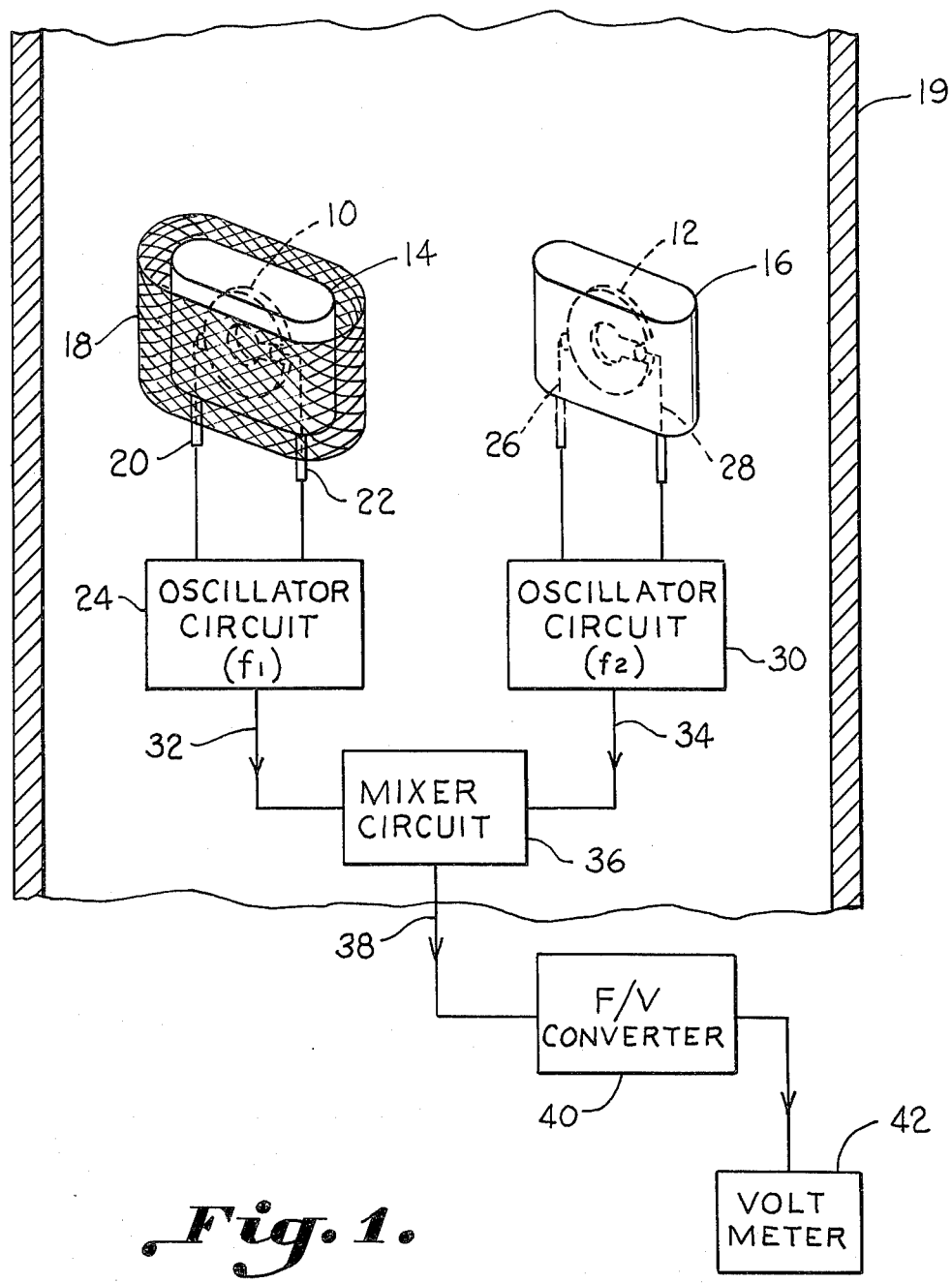
FIG. 1 is a schematic diagram illustrating a carbon monoxide monitor device in accordance with the present invention.

Referring now in more detail to the drawing, Y-Cut heat sensitive quartz crystals schematically illustrated at 10 and 12 are encapsulated in cans 14 and 16, respectively. The cans 14 and 16 are filled with pressurized helium or any other suitable heat conducting gas and protects the crystals from contaminating deposits being formed upon their surfaces. Surrounding can 14 is a wire mesh 18 which carries a thin layer of hopcalite coating (5% silver oxide, 30% copper oxide, 50% manganese dioxide, and 15% colbalt chloride). The wire mesh 18 may be of a preformed shape so as to be friction fitted around can 10 or may be carried closely adjacent thereto in any other suitable manner. It is also contemplated that the wire mesh is preformed in the shape of a basket soldered to the bottom of can 14 and surrounding the can. The basket could then be filled with hopcalite. The encapsulated crystals may be positioned in duct 19 so as to be exposed to a gas stream passing therethrough or may be located in any suitable space in which the concentration of carbon monoxide is to be detected. Crystals 10 and 12 are highly sensitive to heat and will change their frequency in proportion to a change in temperature. Terminals 20 and 22 connect crystal 10 in circuit with a conventional R/C. oscillator circuit 24 which drives the crystal 10. The operating frequency of circuit 24 is controlled by the temperature of crystal 10. Similarly, terminals 26 and 28 connect crystal 12 in circuit with a second oscillator circuit 30 which may also be conventional R/C oscillator circuit. The circuit 30 oscillates at a frequency determined by the temperature of crystal 12. The outputs 32 and 34 leading from oscillator circuits 24 and 30, respectively, are fed into a mixing circuit 36. Circuit 36 may be any conventional mixing circuit such as a dual gate MOS field effect transistor arrangement for detecting any frequency difference between the two frequencies. The output 38 of the mixing circuit is then fed to a frequency/voltage converter 40 for converting the difference in frequency to a D.C. analog voltage which is displayed on a suitable read out device 42.

Hopcalite is a very effective oxidizing agent for carbon monoxide, and the thin layer of Hopcalite 18 surrounding can 14 will act as a catalyst to oxidize the carbon monoxide present in the gas stream in which the can is situated. The oxidizing of the carbon monoxide will cause an exothermic reaction and the heat given off results in a temperature increase in the temperature-sensitive crystal 10. Thus, the temperature and hence frequency ($f_1$) of the crystal 10 will be proportional to the concentration of carbon monoxide in the gas being monitored. Since the hopcalite coating is not placed directly on the surface of the crystal itself, it may readily be replaced or replenished when the monitor is to be used continually.

In use, the two cans 14 and 16 may either be suspended in the sample to be monitored, or a sample stream may be directed equally against the two cans. The highly heat sensitive crystal 10 is used to detect and very accurately measure the heat given off in the exothermic reaction between the hopcalite and the carbon monoxide. Crystal 12 is used as a reference crystal and is exposed to the same ambient air as crystal 10 in order to null out any changes due to the ambient temperature. The temperature of the crystal 12 is essentially not affected by the heat given off in the exothermic reaction. In the absence of carbon monoxide, the oscillating frequencies $f_1$ and $f_2$ of crystals 10 and 12, respectively, are matched so that as the frequency $f_1$ of crystal 10 is changed the difference in frequencies can be ascertained. As the two crystals 10 and 12 contained in cans 14 and 16 are placed in the gas sample whose carbon monoxide content is to be monitored, the frequency $f_1$ of crystal 10 will change due to the exothermic reaction. At the same time, the frequency $f_2$ of crystal 12 will remain constant. The frequencies $f_1$ and $f_2$ are fed into mixer circuit 36 where they are mixed together with the result being that the smaller frequency is substracted from the larger frequency to yield a single net frequency. The net frequency is then converted into a D.C. analog voltage by circuit 40 and is then displayed on read out device 42 which may be a standard volt meter device.

The monitor in accordance with the present invention could be used to detect carbon monoxide concentration either intermittently or continuously. In the later case, the wire mesh 18 may be easily replaced so as to replenish the supply of hopcalite catalytic material without disturbing the crystal materials. This enhances the accuracy and reliability of the monitor in continued use. In one particular application the carbon monoxide monitor is used to continuously detect carbon monoxide concentration in the exhaust gases of automobile engines for reducing the pollution of air. Other uses could include the continuous monitoring of carbon monoxide levels in homes using space gas heaters. The monitor of the present invention is small and compact in size and has a low manufacturing cost making it useful in many applications where the concentration of carbon monoxide needs to be continuously monitored.

While a preferred embodiment of the invention has been described using specific terms, such description is for illustrative purposes only, and it is to be understood that changes and variations may be made without departing from the spirit or scope of the following claims.

What is claimed is:

1. A monitor device for providing a real time, continuous monitor of carbon monoxide concentration in a fluid stream comprising:
   a. a first container filled with a pressurized heat conducting gas;
   b. a first temperature sensitive crystal material encapsulated within said first container;
   c. a second container filled with a pressurized heat conducting gas;
   d. a second temperature sensitive crystal material encapsulated within said second container;
   e. said first container being surrounded by a layer of hopcalite coating for reacting with the carbon monoxide, with said first crystal detecting the heat from said reaction;
   f. a first oscillator circuit having a variable output frequency and having connected therein said first crystal for controlling said output frequency of said first circuit;
   g. a second oscillator circuit having a variable output frequency and having connected therein said second crystal for controlling said output frequency of said second circuit;
   h. said first and second oscillator circuits having matched output frequencies in the absence of carbon monoxide; and
   i. circuit means for comparing said first oscillator circuit output frequency and said second oscillator circuit output frequency to obtain a single net output frequency signal and for converting said single net output frequency into a voltage signal which represents the concentration of carbon monoxide; whereby the carbon monoxide in the fluid stream will react with said hopcalite coating giving off a heat of reaction to heat said first crystal changing the frequency of said first oscillator circuit to create a single difference in said comparing circuit means which is then converted to a voltage signal for providing a continuous readout of the concentration of carbon monoxide.

2. The monitor device of claim 1, wherein said layer of hopcalite coating is carried on a wire mesh screen so as to be easily removed from around said first container.

3. The monitor device of claim 1, wherein said circuit means further comprises:
 a. a mixer circuit connected to said first and second oscillator circuits for receiving the output frequencies therefrom; said mixer circuit combining said output frequencies so as to provide said single net output signal representative of the difference between the output frequencies of said first and second oscillator circuits;
 b. a frequency to voltage converter means for receiving said single net output signal and for converting said signal into an analog voltage; and
 c. a display means for providing a continuous readout display of said voltage.

* * * * *